United States Patent [19]

Tokutsu

[11] Patent Number: 5,064,182
[45] Date of Patent: Nov. 12, 1991

[54] AUTOMATIC ORIGINAL FEEDING DEVICE WITH FEEDING ROLLER

[75] Inventor: Akihito Tokutsu, Yokohama, Japan

[73] Assignee: Kabushiki Kaisha Toshiba, Kawasaki, Japan

[21] Appl. No.: 571,973

[22] Filed: Aug. 24, 1990

[30] Foreign Application Priority Data

Sep. 8, 1989 [JP] Japan .................................. 1-234449

[51] Int. Cl.⁵ .............................................. B65H 5/22
[52] U.S. Cl. ........................................ 271/3; 271/225; 271/902; 271/176; 355/316; 355/315; 355/320; 355/321
[58] Field of Search ................ 355/75, 316, 318, 320, 355/321, 230; 271/3, 3.1, 176, 265, 273, 225, 902

[56] References Cited

U.S. PATENT DOCUMENTS

| | | | |
|---|---|---|---|
| 4,171,128 | 10/1979 | Irvine et al. | 271/273 X |
| 4,285,512 | 8/1981 | Shlatz | 271/233 |
| 4,739,983 | 4/1988 | Ide et al. | 271/233 |
| 4,935,775 | 6/1990 | Ueda et al. | 355/202 |

Primary Examiner—A. T. Grimley
Assistant Examiner—Christopher Horgan
Attorney, Agent, or Firm—Foley & Lardner

[57] ABSTRACT

An automatic original feeding device includes a pick-up mechanism for picking up originals placed on a holding portion, a feed roller for feeding the picked-up original onto an original table of an image forming apparatus and delivering the fed original from the original table, and a discharge mechanism for discharging the delivered original to a discharge portion. The feed roller is arranged to be movable between a contact position where the feed roller is in contact with the original table so that the original can be delivered onto or from the original table, and an off position where the feed roller is separated from the original table. The feed roller is moved to the off position by a moving mechanism at the start of operation of the discharge mechanism.

10 Claims, 9 Drawing Sheets

AUTOMATIC ORIGINAL FEEDING DEVICE WITH FEEDING ROLLER

BACKGROUND OF THE INVENTION

1. Field of the Invention

The present invention relates, to an automatic original feeding device provided in an image forming apparatus, and more particularly, to an automatic original feeding device with a feed roller for delivering originals to a position for exposure.

2. Description of the Related Art

Modern image forming apparatuses, such as copying machines, are expected to be versatile or of high performance. Therefore, these apparatuses are often provided with an automatic original feeding device, in which originals are automatically set in an exposure position on an original table, and are automatically discharged from the table after exposure. A typical example of ,the feeding device of this type is disclosed in U.S. patent application Ser. No. 372,567. This device uses only feed rollers as the transfer means at the end of the original table, instead of using a conveyor belt. More specifically, according to this original feeding device, the feed rollers are arranged at the rear end of the original table so that the originals can be transported between the rollers and the table. Each original, picked up from an original tray by means of pick-up means, is fed forward by the feed rollers, and is then moved back a short distance so that it abuts against a stopper at the rear end of the original table. Thus, the original is set in the exposure position on the table. After it is exposed, the original taken out from the original table by means of the same feed rollers, and is then discharged onto an original receiving tray by means of discharge rollers, or transported toward aligning rollers by means of reversal rollers.

In the automatic original feeding device constructed in this manner, however, even when the original from the feed rollers reach the discharge rollers or the reversal rollers, its end portion is still held between the original table and the feed rollers, and is subjected to a conveying force from the feed rollers. Therefore, the feed rollers must be driven at the same speed as the discharge rollers or the reversal rollers. If these rollers are driven by means of a common motor, however, a complicated, large-sized power transmission mechanism is required, constituting a hindrance to reduction of the size, weight, and manufacturing cost of the device. If the rollers are driven by means of separate motors, on the other hand, different characteristics are expected of the drive sources for the feed rollers, which require a high rotating speed for high-speed operation, and for the discharge rollers or the reversal rollers, which require a low rotating speed for reliable discharge of the original paper. Thus, it is difficult to equalize the respective transportation speeds of the rollers, and the power transmission mechanism is complicated. If the drive speed of the discharge rollers is lower than that of the feed rollers, for example, the original will be bent within the transfer path between the rollers, and be doubled or damaged. If the drive speed of the discharge rollers is higher than that of the feed rollers, on the other hand, the original will be pulled by the rollers in the transfer path between them, so that it will possibly be torn or stained with rubbing marks of the rollers. This also applies to the case of the reversal rollers. The feed rollers are always on the original table, and, at the time of delivery of the original, are engaged in the discharge of the original until the trailing end of the original passes the feed rollers entirely. After the image forming operation is finished, therefore, a subsequent original cannot be fed onto the original table before the trailing end of the preceding original passed the feed rollers. Thus, the original feeding operation, and therefore, the image forming operation, cannot be performed at high speed.

SUMMARY OF THE INVENTION

The present invention has been developed in consideration of these circumstances, and its object is to provide a compact automatic original feeding device of simple construction and high reliability, in which originals can be smoothly fed or delivered without being damaged, so that the image forming operation can be performed at higher speed.

In order to achieve the above object, a device according to the present invention comprises: means for picking up originals placed at a first position; means for feeding the picked up original onto an original table of an image forming apparatus and delivering the fed original from the original table, the feeding means being movable between an operating position, where the feeding means is in contact with the original table so as to deliver the original from the original table, and a nonoperating position where the feeding means is separate from the original table; means for discharging the delivered originals to a second position; and means for moving the feeding means to the nonoperating position at the start of operation of the discharging means.

According to the arrangement described above, the feeding means is moved to the nonoperating position, where it is kept off the original table, and therefore, off the original paper, at the start of the transportation of the original paper by means of the discharging means. Thus, the feeding means is not concerned in the discharge of the original, so that the original is discharged by the operation of the discharging means only. Accordingly, there is no need of any mechanism for equalizing the respective drive speeds of the feeding means and the discharging means, so that the device can be simplified and reduced in size and manufacturing cost. Further, the original can be prevented from being damaged while it is being discharged. Also, a subsequent original can be fed even in the middle of its discharge, so that the image forming operation can be performed at higher speed.

Additional objects and advantages of the invention will be set forth in the description which follows, and in part will be. obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention, and together with the general description given above and the detailed description of the preferred embodiment given below, serve to explain the principles of the invention.

FIGS. 1 to 11 show an image forming apparatus with an automatic original feeding device according to an embodiment of the present invention, in which:

DETAILED DESCRIPTION OF THE PREFERRED EMBODIMENTS

An embodiment of the present invention will now be described in detail with reference to the accompanying drawings.

Figure 1:
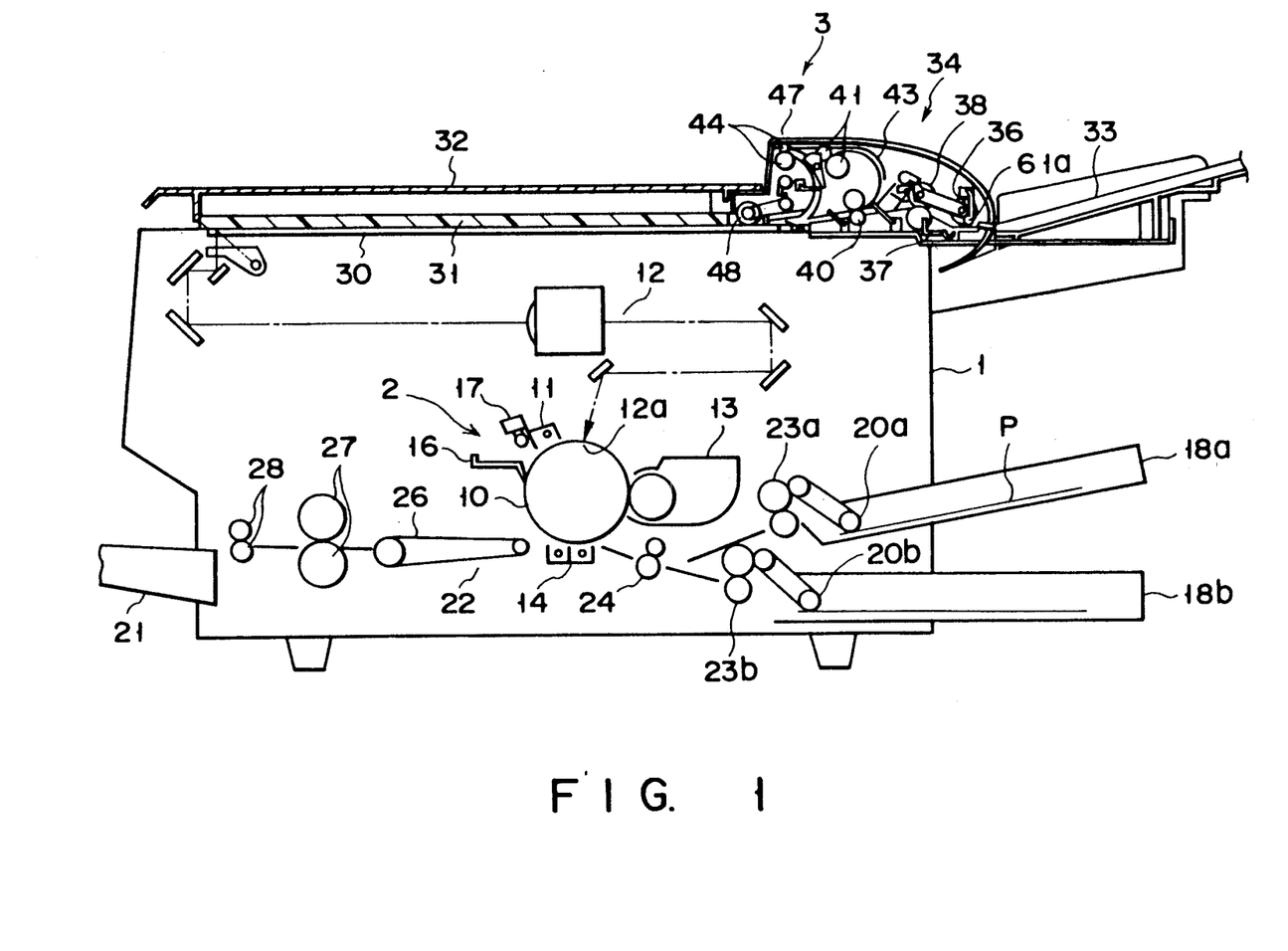
FIG. 1 is a sectional view showing an outline of the image forming apparatus.

FIG. 1 shows an outline of an image forming apparatus with an automatic original feeding device 3 according to the invention. The apparatus comprises an apparatus housing 1, which contains image forming process unit 2 for performing charging, exposure, developing, transfer, cleaning, fixing, etc. The automatic original feeding device 3 is arranged on the top of the apparatus housing 1. The process unit 2 includes a photoconductive drum 10 as an image carrier in the housing 1, along with a main charger 11, an exposure portion 12a of an exposure unit 12, a developing unit 13, a transfer/separation charger 14, a cleaning unit 16, and a de-electrification unit 17, which are arranged successively around the drum 10 in the rotating direction thereof. First and second cassettes 18a and 18b, stored with paper sheets P, are attached to the right-hand side of the apparatus housing 1. Formed in the housing 1, moreover, is a transfer path 22 along which the paper sheets P, taken out from the cassettes 18a and 18b by means of pickup rollers 20a and 20b, are guided via the photoconductive drum 10 into a receiving tray 21 attached to the eft-hand side of the housing 1. First and second separation rollers 23a and 23b and aligning rollers 24 are arranged on the upper-course side of the path 22, with respect to the drum 10, while a conveyor belt 26, a fixing unit 27, and discharge rollers 28 are arranged on the lower-course side of the path. An original table 30 or a platen glass is disposed on the top face of the apparatus housing 1.

The automatic original feeding device 3 will now be described in detail.

Figure 2:
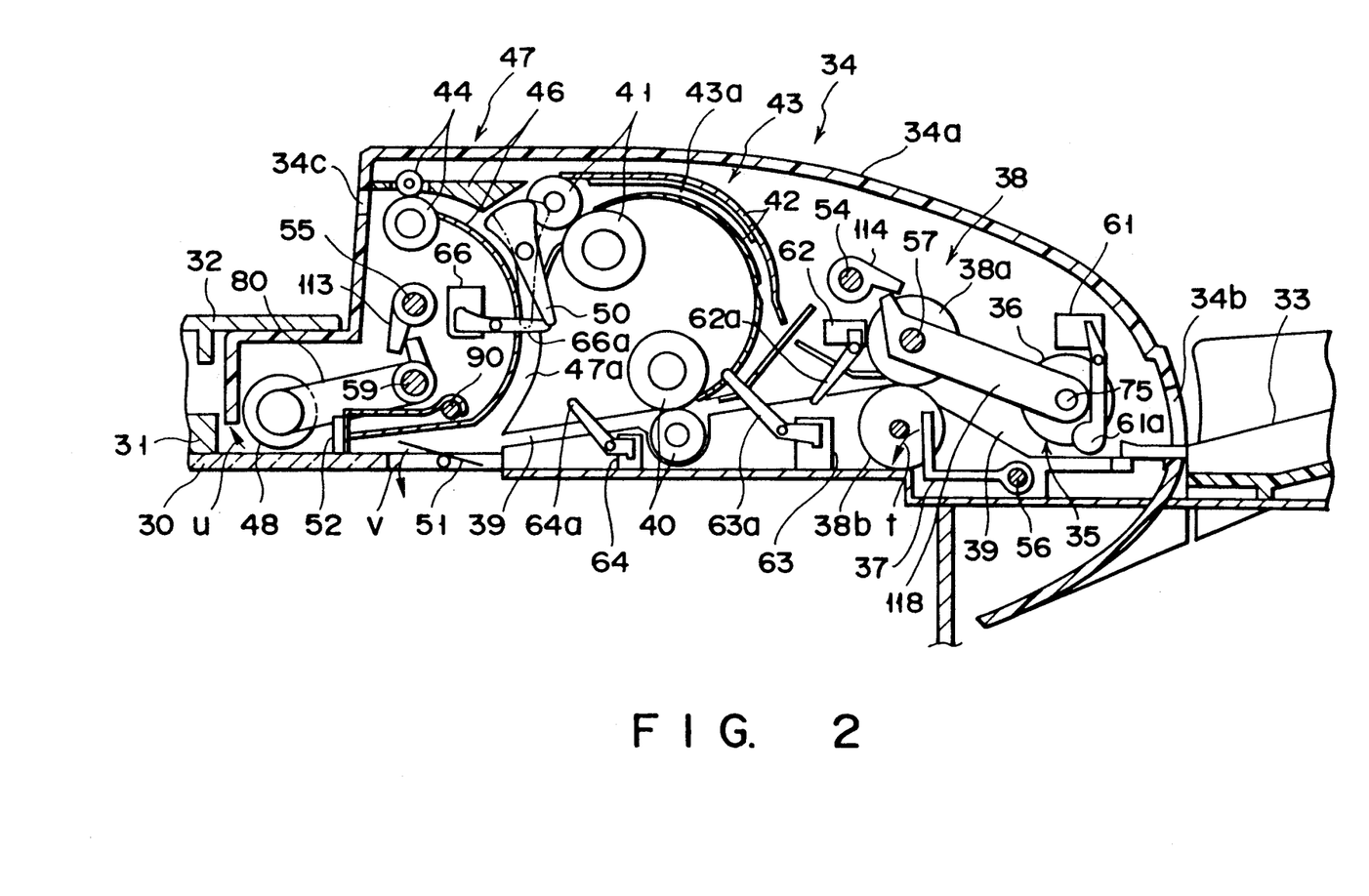
FIG. 2 is a sectional view of the original feeding device.
Figure 3:
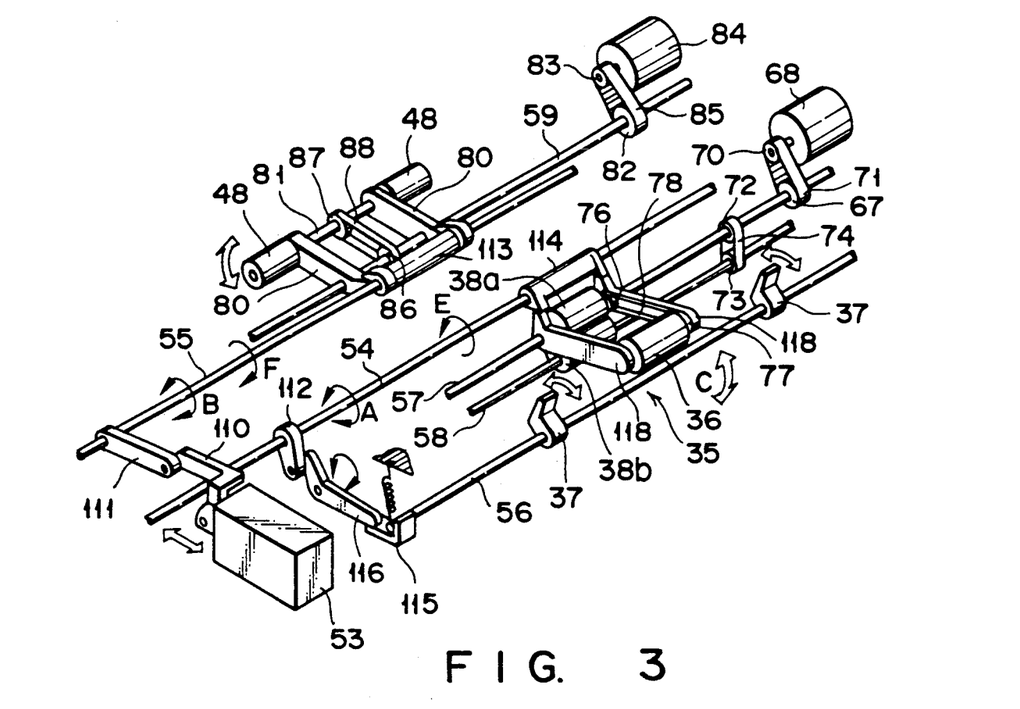
FIG. 3 is a perspective view schematically showing the principal part of a drive mechanism of the original feeding device

As shown in FIGS. 2 and 3, the device 3 comprises an original cover 32 swingably mounted on the top of the apparatus housing 1, an original tray 33 extending from the right end portion of the top face of the housing 1, and an original feeding mechanism 34 arranged between the cover 32 and the tray 33. The feeding mechanism 34 takes out originals D on the original tray 33 one by one, and automatically feeds each original to an exposure position on the original table 3. After the original is exposed, it is discharged onto the upper surface of the cover 32. A platen sheet 31 for holding down the original on the table 30 is provided inside the cover 32. When the cover 32 is shut down, the sheet 31 is supported by the cover 32 so as to be movable between a hold position in contact with the surface of the original table 30 and an open position off the table surface, as mentioned later.

The feeding mechanism 34 is provided with a cover 34a which is located on the top face of the apparatus housing 1 so as to cover the whole mechanism 34. Defined inside the cover 34a is an original transfer path 39 along which the original is guided from the original tray 33 to the original table 30. The mechanism 34 includes a pick-up mechanism 35 for picking up the originals on the tray 33 one by one to the transfer path 39, a separation unit 38 having a paper-supply roller 38a and separation roller 38b, aligning rollers 40, and feed rollers 48 for delivering the original paper onto and from the original table 30. These elements are arranged successively along the path 39 between the tray 33 and the table 30.

Figure 5A:
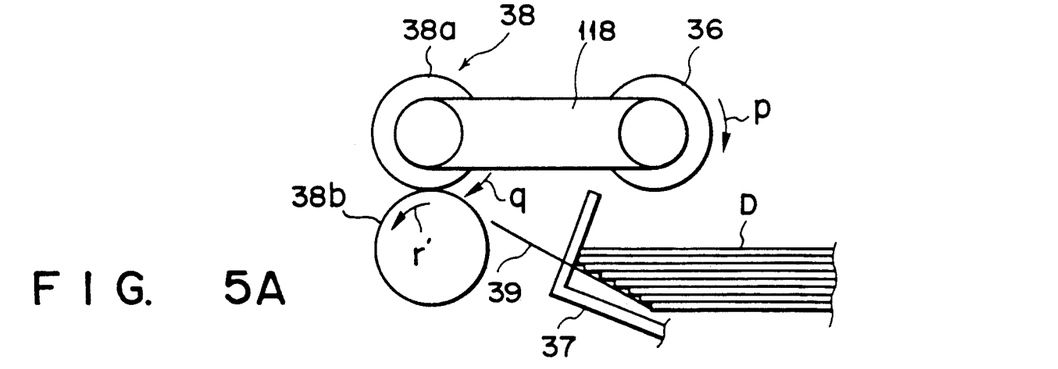
FIG. 5A is a schematic view of an original pick-up mechanism in a state such that a pickup roller is raised.

A first switch 61 for detecting the presence of the original on the original tray 33 is provided in the vicinity of the pick-up mechanism 35. The switch 61 includes a first actuator 61a extending into the transfer path 39. The leading end portion of the original on the tray 33 is inserted through an inlet aperture 34b of the cover 34a and advanced close to the separation unit 38, as shown in FIG. 5A. Thereupon, the actuator 61a is pressed and rocked by the leading end portion of the original, thereby turning the switch 61 on.

A plurality of first stoppers 37 are arranged between the first actuator 61a and the separation unit 38. These stoppers 37 are rockable between a closed position (FIG. 5A), where they project into the transfer path 39, and an open position (FIG. 5B) recessed from the path 39, as mentioned later. In the closed position, the stoppers 37 abut against the leading ends of the originals on the original tray 33, thereby positioning the originals and restraining excessive insertion of the originals.

Second and third switches 62 and 63 are arranged between the separation unit 38 and the aligning rollers 40. The second switch 62, which includes a second actuator 62a extending into the transfer path 39, is used to detect jamming of the originals in the path 39. The third switch 63, which includes a third actuator 63a extending into the path 39, is used to detect the trailing end of the original passing through the path 39. The length of the original paper can be detected on the basis of the time interval which elapses from the instant that the leading end of the original passes the second actuator 62a until the trailing end of the original passes the third actuator 63a. Arranged between the aligning rollers 40 and the feed rollers 48, moreover, is a fourth switch 64 which includes a fourth actuator 64a extending into the transfer path 39. The switch 64 is used to detect the trailing end of the original to time the drive of the feed rollers 48. A fifth switch (not shown) is provided adjacent to the fourth switch 64, and the fourth and fifth switches cooperatively detect the width of the original. Thus, the size of the original ca be detected by means of the second to fifth switches.

A second stopper 52 is provided at the terminal end of the transfer path 39. The stopper 52 is rockable between a down position (FIG. 2), where it contacts the original table 30, and an up position off the table, as mentioned later. In the down position, the stopper 52 positions the trailing end of the original on the table 30.

The feed rollers 48, which are located between the stopper 52 and the platen sheet 31, are rockable between a down position, where they contact the upper surface of the original table 30, and an up position off the table, as mentioned later. In the down position, the rollers 48 deliver the original, fed through the transfer path 39, onto the table 30, or deliver the exposed original from the table into a discharge path 47a (mentioned later).

An original discharge mechanism 47 and an original reversal mechanism 43 are arranged over the transfer path 39. The discharge mechanism 47 includes a pair of curved guides 46, which define the curved discharge path 47a extending from the terminal portion of the path 39 to an outlet aperture 34c in the cover 34a. In the discharge path 47a, a pair of discharge rollers 44 are located close to the aperture 34c.

The reversal mechanism 43 includes a pair of curved guides 42, which define a curved reversal path 43a diverging from the middle portion of the discharge path 47a and communicating with the transfer path 39 on the upper-course side of the aligning rollers 40. A pair of reversal rollers 41 are arranged in the reversal path 34a at the region near the diverging point. The discharge rollers 44 and the reversal rollers 41 constitute the transfer means of the present invention.

Disposed at the diverging point between the discharge path 47a and the reversal path 43a is a reversal gate 50, which is used to change the course of the exposed original delivered from the original table 30. The gate 50 is shiftable between a discharge position indicated by a full line in FIG. 2 and a reversal position indicated by a broken line. When the gate 50 is in the discharge position, the exposed original is guided to the discharge rollers 44 through the discharge path 47a and the gate, and is further discharged through the outlet aperture 34c onto the original cover 32 by means of the rollers 44. When the gate 50 is shifted to the reversal position, the exposed original is guided into the reversal path 43a through the discharge path 47a and the gate, and is further delivered through the path 43a to the aligning rollers 40. A rockable urging plate 51 is arranged at the terminal portion of the transfer path 39. The plate 51 pushes up the trailing end portion of the original paper delivered from the table 30, so that the paper is guided into the discharge path 47a.

A sixth switch 66, having a sixth actuator 66a extending into the discharge path 47a, is provided in the vicinity of the path 47a. The switch 66 is used to detect the trailing end of the original paper to time the start of drive of the discharge rollers 44 and the reversal rollers 41.

The following is a description of the precise construction of the individual elements of the original feeding mechanism 34 described above and a drive mechanism for driving these elements.

As shown in FIGS. 2 and 3, the drive mechanism has first to sixth shafts 54 to 59, which are rotatably supported on a frame (not shown) of the original feeding device 3. These shafts extend parallel to one another and perpendicular to the moving direction of the original.

The intermediate portion of a first arm 110 is fixed to one end of the first shaft 54. A plunger of a first solenoid 53 is connected to one end of the arm 110. As the solenoid 53 is energized, the first arm 110 is rotated integrally with the first shaft 54, in the direction of arrow A of FIG. 3. The other end of the arm 110 is rockably connected to one end of a second arm 111, the other end of which is fixed to the second shaft 55. Thus, when the first arm 110 is rocked by the solenoid 53, the second shaft 55 is rotated integrally with the second arm 111, in the direction of arrow B of FIG. 3. First and second cams 112 and 114 are fixed to the first shaft 54 so as to be rotatable integrally therewith. A third cam 113 is fixed to the second shaft 55 so as to be rotatable integrally therewith.

The original stoppers 37 are fixed to the third shaft 56. A third arm 115 is fixed to one end of the shaft 56. A rocking arm 116 is disposed between the first cam 112 and the third arm 115 so that its middle portion is rotatably supported by the device frame. Thus, when the first shaft 54 is rotated by the solenoid 53, the third shaft 56 is rotated by means of the first cam 112 and the third arm 115, so that the stoppers 37 are rocked between the aforesaid open and closed positions.

The paper-supply roller 38a of the separation unit 38, which is fixed to the fourth shaft 57, is situated near the second cam 114. The separation roller 38b, which is fixed to the fifth shaft 58, is in contact with the roller 38a. A first toothed pulley 67 is fixed to one end of the fourth shaft 57, and a toothed belt 71 stretched between the pulley 67 and a drive pulley 70 fixed to the rotating shaft of a first motor 68. Second and third toothed pulleys 72 and 73 are fixed to the fourth and fifth shafts 57 and 58, respectively, and a toothed belt 74 is stretched between the pulleys 72 and 73. Thus, when the motor 68 is actuated, the paper-supply roller 38a is rotated by means of the fourth shaft 57, and the separation roller 38b is rotated by means of the fourth shaft 57, second pulley 72, belt 74, third pulley 73, and fifth shaft 58.

On the other hand, the pick-up mechanism 35 includes a pair of support arms 118, rockably mounted on the fourth shaft 57, and a pickup roller 36 rotatably supported on a pivot 75 fixed between the arms 118. The other end of each support arm 118 is opposed to the second cam 114 which is fixed to the first shaft 54. Thus, when the shaft 54 is rotated by the solenoid 53, the arm 118 is rocked in the direction of arrow C of FIG. 3 by means of the cam 64. Accordingly, the pickup roller 36 is rocked between a down position (see FIG. 5B), where it is in contact with the uppermost original on the original tray 33, and an up position (FIG. 5A) off the original. Fourth and fifth toothed pulleys 76 and 77 are fixed to the fourth shaft 57 and the pivot 75 of the roller 36, respectively, and a toothed belt 78 is stretched between the pulleys 76 and 77. Thus, when the shaft 57 is rotated by the motor 68, the pickup roller 36 is rotated by means of the fourth pulley 76, belt 78, and fifth pulley 77. The first to fifth toothed pulleys 67, 72, 73, 76 and 77 each contain a clutch for adjusting the rotating speed of or the timing for the drive of the rollers 36, 38a and 38b. The drive force of the first motor 68 is also transmitted to the aligning rollers 40, reversal rollers 41, and discharge rollers 44 by means of a power transmission mechanism (not shown).

A pair of rocking arms 80 are rockably supported on the sixth shaft 59. One end of each arm 80 can be brought into contact with the third cam 113 which is fixed to the second shaft 55. A pivot 81 is rotatably passed through the respective other ends of the arms 80, and the feed rollers 48 are fixed to the pivot 81. When the second shaft 55 is rotated by the solenoid 53 through the medium of the first and second arms 110 and 111, the rocking arms 80 are rocked around the sixth shaft 59 by the third cam 113. Thus, the feed rollers 48, along with the arms 80, are rocked between the up and down positions.

A sixth toothed pulley 82 is fixed to the sixth shaft 59, and a fourth toothed belt 85 is stretched between the pulley 82 and a drive pulley 83 of a second motor 84. Seventh and eighth toothed pulleys 86 and 87 are fixed to the sixth shaft 59 and the pivot 81, respectively, and a fifth toothed belt 88 is stretched between the pulleys 86 and 87. Thus, when the second motor 84, formed of a pulse motor, is actuated, the feed rollers 48 are rotated by means of the toothed belt 85, sixth pulley 82, sixth shaft 59, seventh pulley 86, toothed belt 88, eighth pulley 87, and pivot 81.

Figure 4:
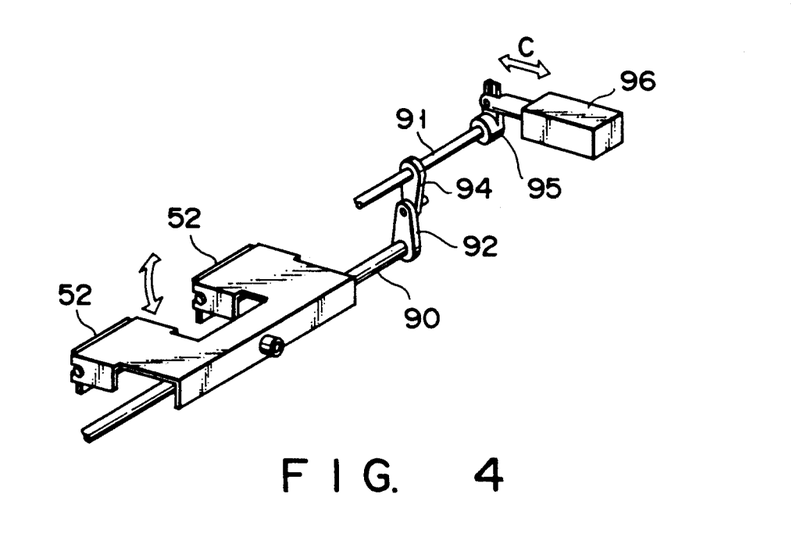
FIG. 4 is a perspective view of a drive mechanism for a stopper.

As shown in FIG. 4, moreover, the drive mechanism has seventh and eighth shafts 90 and 91, which are rotatably supported by the device frame. The second stopper 52 and a fourth arm 92 are fixed to the seventh shaft 90 so a to be rockable integrally therewith. Fifth and sixth arms 94 and 95 are fixed to the eighth shaft 91. One end of the fifth arm 94 is rockably connected to one end of the fourth arm 92, and the sixth arm 95 is connected to a plunger of a second solenoid 96. Thus, when the solenoid 96 is energized so that its plunger is moved in the direction of arrow C of FIG. 4, the second stopper 52 is rocked between its up and down positions by means of the seventh and eighth shafts and the fourth to sixth arms.

According to the drive mechanism constructed in this manner, the feed rollers 48 are driven by means of the second motor 84, while the other rollers are driven by means of the first motor 68. The stoppers 37, pickup roller 36, feed rollers 48 are moved between the open and closed positions or between the up and down positions by means of the single solenoid 53.

Figure 6:
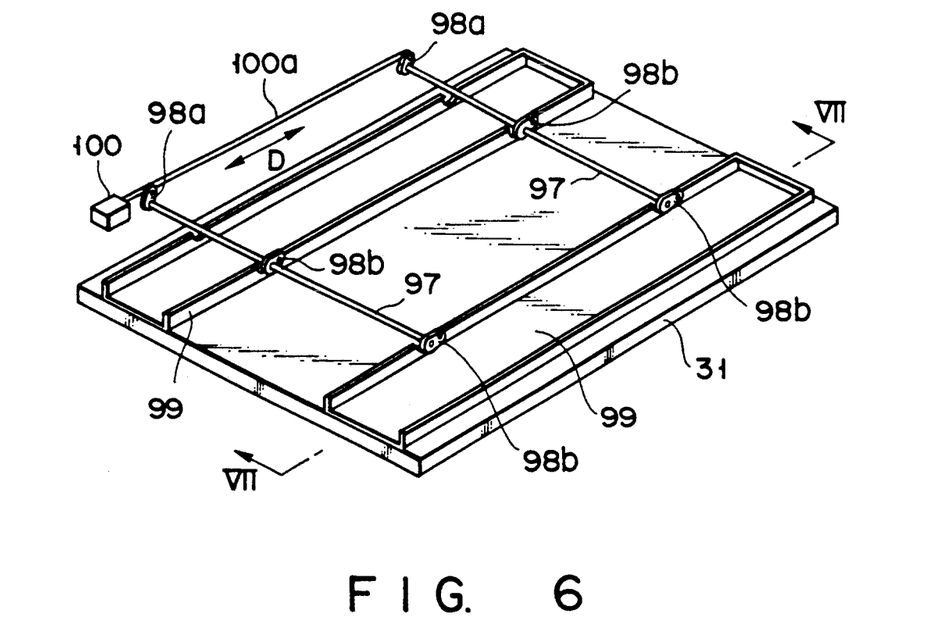
FIG. 6 is a perspective view of a platen sheet.
Figure 7:
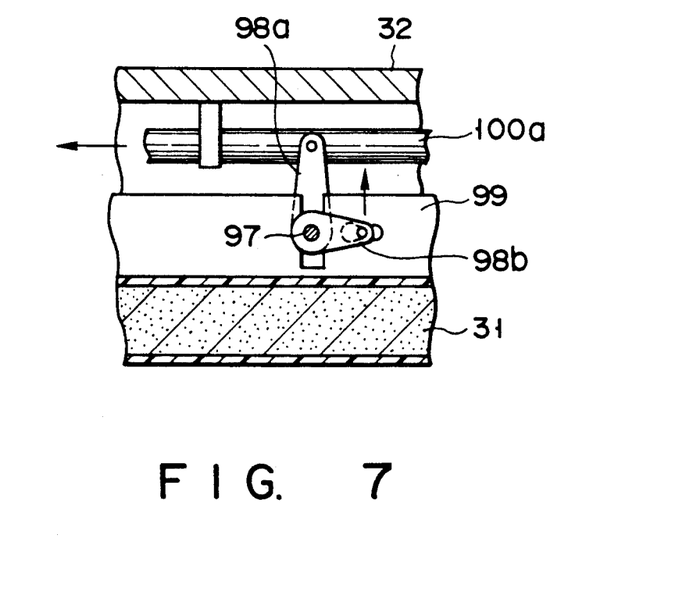
FIG. 7 is a sectional view showing an original cover.

As shown in FIGS. 1, 6 and 7, the original cover 32 is mounted on the housing 1 by means of hinges (not shown) so as to be rockable between a closed position shown in FIG. 1, where it covers the original table 30, and an open position where the table 30 is exposed. The platen sheet 31 is supported for u and down motion inside the cover 32.

More specifically, a pair of support shafts 97 are rotatably attached to the cover 32 so as to extend perpendicular to the original feeding direction, as shown in FIGS. 6 and 7. A pair of cams 98b are fixed to each shaft 97 for integral rocking motion therewith. A end portion of each cam 98b is rockably connected to its corresponding one of frames 99, which are fixed on the upper surface of the platen sheet 31. Further, a cam 98a is fixed to one end of each shaft 97 for integral rocking motion therewith. A third solenoid 100 for raising and lowering the sheet 31 is fixed to the cover 32 so that its plunger 100a extends perpendicular to the shafts 97. An end portion of each cam 98a is rockably connected to the plunger 100a.

Figure 8:
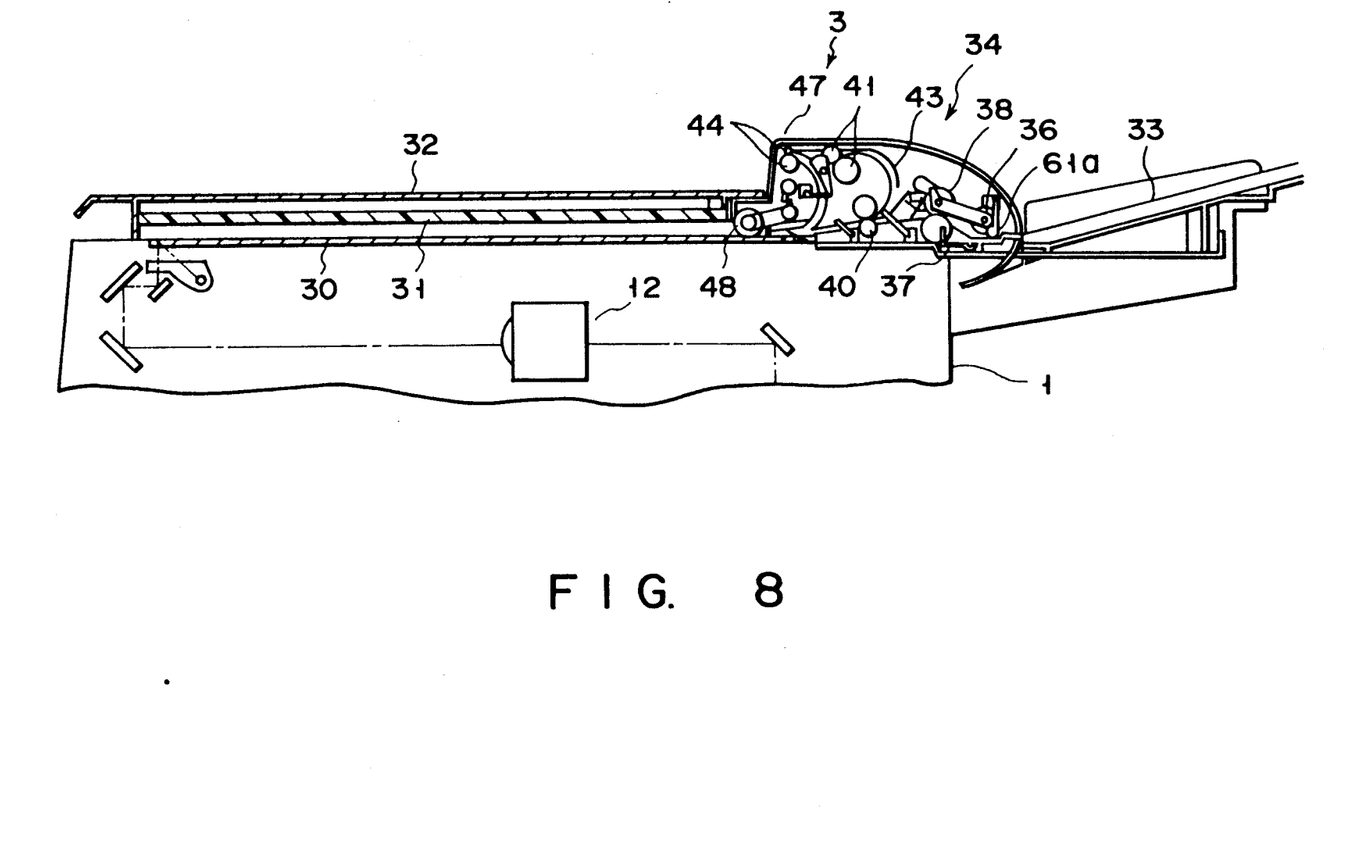
FIG. 8 is a sectional view showing the original cover and its surroundings in a state such that the platen sheet is lowered.

Thus, when the solenoid 100 is excited so that the plunger 100a is driven in the direction of arrow D of FIG. 6, the platen sheet 31 is moved between a down position shown in FIG. 1, where it is in contact with the original table 30, and an up position shown in FIG. 8 where it is separated from the table 30.

Figure 9:
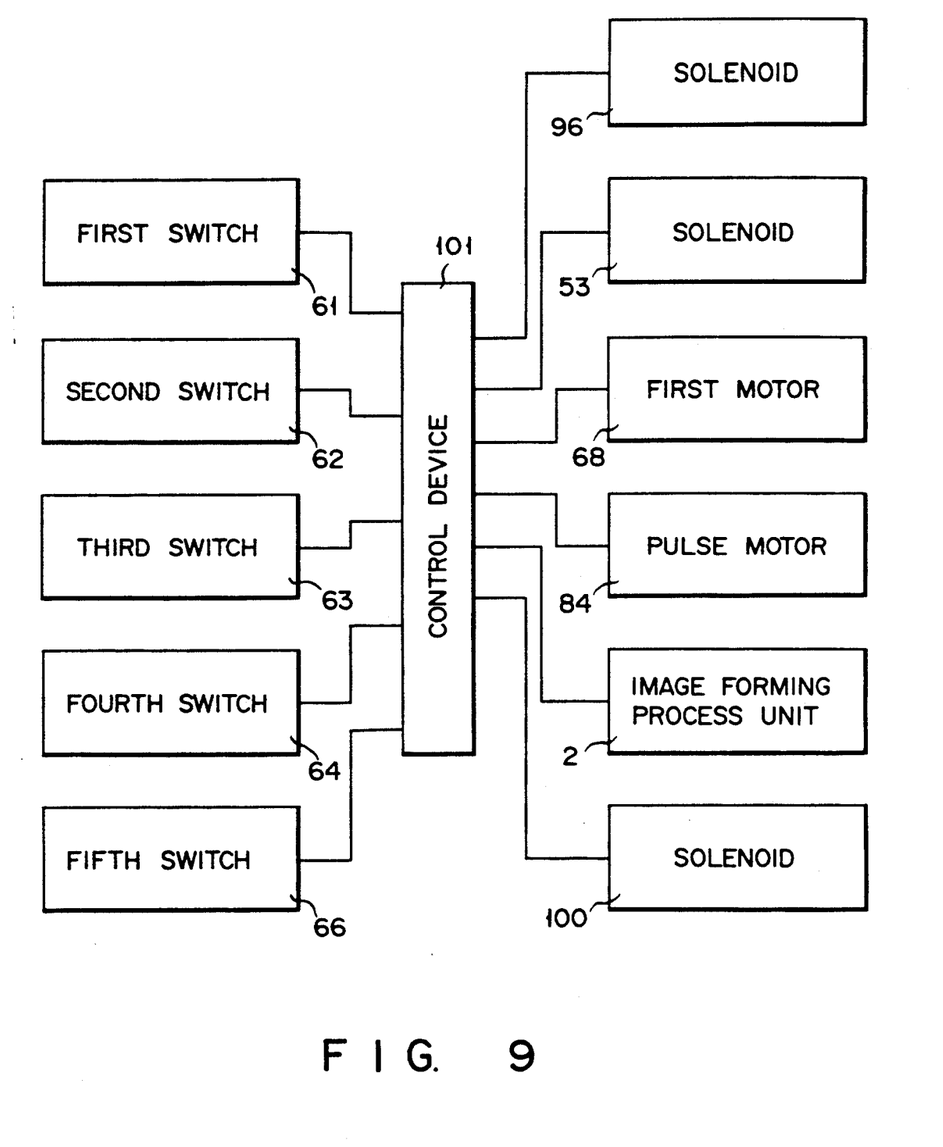
FIG. 9 is a schematic view of a control mechanism.

In the automatic original feeding device 3 constructed in this manner, the first to sixth switches 61 to 66, the first to third solenoids 53, 96 and 100, the first and second motors 68 and 84, and a solenoid (not shown) for driving the reversal gate 50 are connected to a control unit 101 for controlling the operation of the image forming process unit 2 and the like, as shown in FIG. 9.

The following is a description of the operation of the image forming apparatus constructed in this manner.

Figure 10:
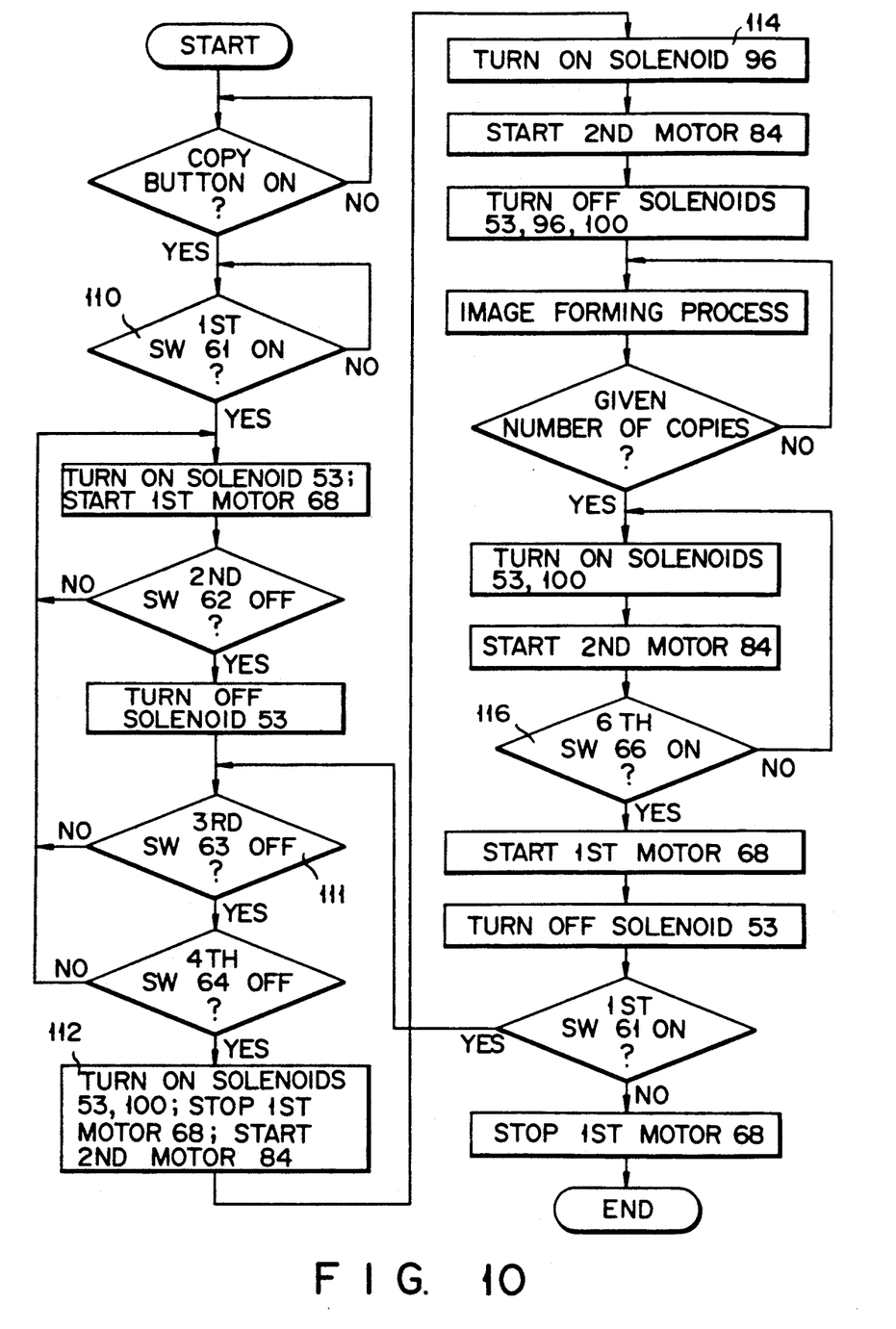
FIG. 10 is a flowchart for illustrating the operation of the original feeding device for single-side copying.

Referring first to the flowchart of FIG. 10, a case will be explained in which an image is formed only on one side of the original D.

Before starting a copying operation, the originals D are placed on the original tray 33. At this point of time, the first stoppers 37 are in the closed position shown in FIG. 5A, where they cut off the transfer path 39. Accordingly, the leading ends of the originals D abut against the stoppers 37, so that the originals D are prevented from being excessively inserted toward the separation unit 38 and is located in a predetermined position. In this state, image forming conditions, such as paper size, number of copies, scale, single-side copying, etc., are entered in the control unit 101. Thereupon, the reversal gate 50 is set in the discharge position indicated by full line in FIG. 2.

Subsequently, when a copy button on a control panel is depressed, the copying operation is started, and the presence of the original D is detected by means of the first switch 61. If the switch 61 is on, the control unit 101 turns on the first solenoid 53 and the first motor 68. Thereupon, the first and second cams 112 and 114 are rocked in the direction of arrow E of FIG. 3 by means of the first arm 110 and the first shaft 54. The first cam 112, rocked in this manner, causes the first stoppers 37 to be rocked from the closed position to the open position by means of the rocking arm 116, third arm 115, and third shaft 56. As the second cam 114 rocks in the direction of arrow E, moreover, those end portions of the support shafts 118 of the pick-up mechanism 35 situated on the side of the cam 63 are opened. Accordingly, the pickup roller 36 is rocked to the down position by gravity. In other words, it is placed on the uppermost original on the original tray 33. When the solenoid 53 is excited, moreover, the third cam 113 is rocked in the direction of arrow F by means of the first and second arms 110 and 111 and the second shaft 55. As a result, those end portions of the rocking arms 80 situated on the side of the cam 113 are opened, so that the feed rollers 48 are moved to their down position by gravity, whereupon they engage the upper surface of the original table 30.

Figure 5B:
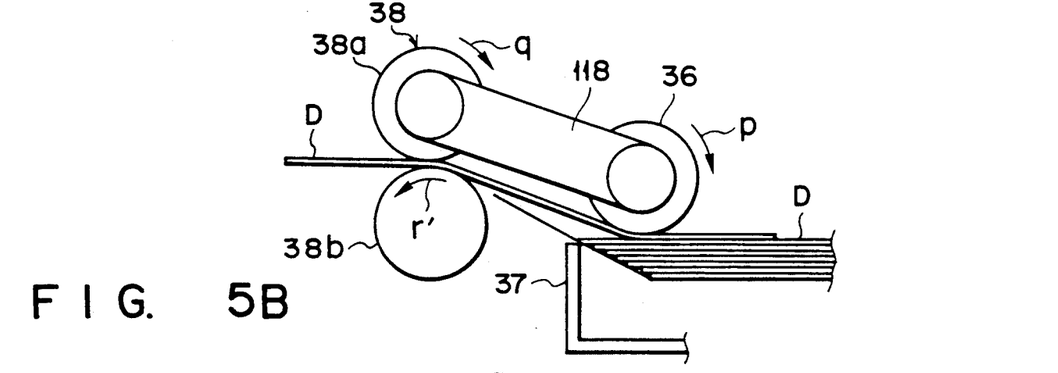
FIG. 5B is a schematic view of the original pick-up mechanism in a state such that the pickup roller is lowered.
Figure 5C:
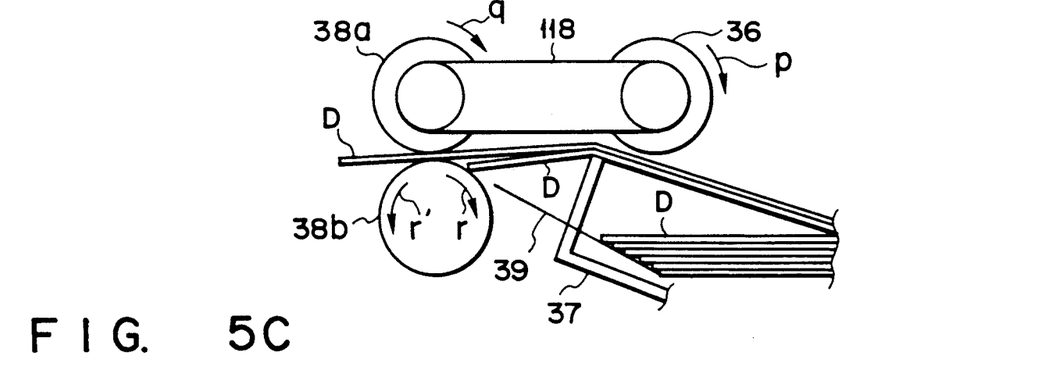
FIG. 5C is a schematic view of the original pick-up mechanism in a state such that the pickup roller and original stoppers are raised.

When the first motor 68 is actuated, the pickup roller 36, paper-supply roller 38a, and separation roller 38b are rotated in the directions of arrows p, q and r', respectively, of FIGS. 5A to 5C. The aligning rollers 40 start to be rotated in a predetermined time after these rollers are actuated. Thus, the uppermost original D on the original tray 33 is taken out into the transfer path 39 by means of the pickup roller 36, and fed between the rollers 38a and 38b. If only one original D is picked up by the roller 36, the separation roller 38b, urged by the original D, is rotated in the direction of arrow r' or feeding direction, since the force of paper supply of the paper-supply roller 38a is relatively strong. If a plurality of originals d are picked up by the roller 36 (FIG. 5C), however, the roller 38b is rotated in the separating direction of arrow r, since the separating force of the roller 38b is stronger than the frictional force between the originals. Accordingly, the other originals than the first one, temporarily held between the rollers 38a and 38b, are returned to the original tray 33 by the separation roller 38b. Once the originals are separated, the roller 38b is hauled by the first original, thereby rotating again in the direction of arrow r'. If the first stoppers 37 are then held in the open position, the second original and the ones subsequent thereto are caught again by the separation unit 38, due to friction with the first original. Thus, the separating operation is repeated.

If the second switch 62 is turned off after the first original is delivered from the separation unit 38, however, the control unit 101 turns off the first solenoid 53. Thereupon, the first stoppers 37, pickup roller 36, and feed rollers 48 are moved to their respective open or up positions. Thus, the stoppers 37 project into the transfer path 39, thereby pushing up the picked-up originals as shown in FIG. 5C. The second original and the subsequent ones are bent in the middle by the stoppers 37, so that they are prevented from reaching the separation unit 38. Thus, the separating operation is accelerated.

If the third switch 63, following the second switch 62, is turned off by the original D, the control unit 101 detects the length of the original D in accordance with off-signals from these switches. After the leading end of the original D is trued up by the aligning rollers 40, the original D is delivered to the side of the feed rollers 48 by the rollers 40. In the meantime, the fourth switch 64 and the fifth switch (not shown) are turned off by the original D, and the control unit 101 detects the size of the original D in accordance with off-signals from these switches. At this point of time, the second stopper 52 and the feed rollers 48 are held in their respective up positions. Accordingly, the leading end portion of the original D is transported to the end portion of the original table 30.

Subsequently, when the trailing end of the original D is detected by means of the fourth switch 64, the first solenoid 53 is turned on, so that the feed rollers 48, along with the first stoppers 37 and the pickup roller 36, are moved to their down position. Thus, the rollers 48 are placed on the leading end portion of the original D transported thereto. The moment the solenoid 53 is excited, the first motor 68 is stopped, and the second motor 84 is driven for a given number of revolutions. At the same time, the third solenoid 100 is turned on, so that the platen sheet 31 is moved to its up position. Accordingly, the feed rollers 48 are rotated in the direction of arrow u of FIG. 2, for a given number of revolutions, by the motor 84, thereby feeding the original D onto the original table 30. After the trailing end of the original D passes the second stopper 52, the second motor 84 is stopped, and at the same time, the second solenoid 96 is turned on to move the stopper 52 to its down position. Then, the motor 84 is reversely rotated for a given number of revolutions, so that the feed rollers 48 are rotated in the direction opposite to the direction of arrow u, for a given number of revolutions. Thus, the original D is transported so that its trailing end abuts against the stoppers 52, whereupon it is positioned in a predetermined position on the original table 30, that is, the exposure position.

Thereafter, the first to third solenoids 53, 96 and 100 are turned off, so that the feed rollers 48, first and second stoppers 37 and 52, and pickup roller 36 are moved to their respective up positions. Further, the platen sheet 31 is moved to its down position, whereupon it presses down the original D against the original table 30. In this state, an image forming process is repeated for a given number of copies by means of the image forming process unit 2 disposed in the apparatus housing 1.

In the image forming process, the photoconductive drum 10 is first rotated to be uniformly charged by means of the main charger 11. Thereupon, an electrostatic latent image corresponding to an image on the original D is formed on the drum 10 at the exposure portion 12a. As the drum 10 rotates, thereafter, the latent image is developed by the developing unit 13, and then reaches the transfer/separation charger 14. In synchronism with this operation, a paper sheet P of a size specified through the control panel (not shown) is supplied from the cassette 18a or 18b, and is delivered to the charger 14 via the separation roller 23a or 23b and the aligning rollars 24. After the toner image on the photoconductive drum 10 is transferred to the sheet P, the sheet is separated from the drum. Then, the sheet P is transported to the fixing unit 27, whereupon the transferred image is fixed to the sheet. Thereafter, the sheet P is discharged onto the receiving tray 21 by means of the discharge rollers 28. After the transfer, the drum 10 is cleared of residual toner particles by means of the cleaning unit 16, and is erased by means of the de-electrification unit 17, to be ready for the next copying cycle. Thereafter, the image forming process is repeated for a given number of copies.

After the end of the image forming process, the first solenoid 53 is turned on, so that the feed rollers 48, pickup roller 36, and first stoppers 37 are moved to their respective down positions. At the same time, the third solenoid 100 is turned on, so that the platen sheet 31 is moved to its up position. The second motor 84 is actuated with the feed rollers 48 on the trailing end portion of the original D, so that the rollers 48 are reversely rotated for a given number of revolutions. Also, the urging plate 51 is rocked in the direction of arrow v for a given time by means of a solenoid (not shown). Thus, the original D is delivered from the original table 30 into the discharge path 47a by the rollers 48. Since the reversal gate 50 is then held in the discharge position indicated by full line in FIG. 2, the original D is transported toward the outlet aperture 34c.

When the sixth switch 66 in the discharge path 47a is turned on by the original D delivered into the path 47a, the control unit 101 actuates the first motor 68 to rotate the discharge rollers 44, and turns off the first solenoid 53 after a predetermined time delay, that is, when the leading end of the original D reaches the rollers 44. As a result, the feed rollers 48 are separated from the original D and moved to their up position, whereupon the original D is discharged through the outlet aperture 24c onto the upper surface of the original cover 32 by means of the discharge rollers 44.

The moment the first motor 68 is actuated in response to an on-signal from the sixth switch 66, the pickup roller 36 and the separation unit 38 are also actuated. At this point of time, the control unit 101 detects the operating state of the first switch 61. If the switch 61 is on, that is, if the second original exists on the original tray 33, the unit 101 repeats the aforementioned processes of operation. Thus, after the second original is taken out by means of the pickup roller 36, it is transported toward the feed rollers 48 by means of the aligning rollers 40. Further, the original D is fed onto the original table 30, and is discharged onto the upper surface of original cover 32 after exposure.

If no original is on the original tray 33, and if the first switch 61 is off, the control unit 101 switches off the first motor 68 after the passage of a predetermined time after the trailing end of the original is detected by means of the sixth switch 66, and stops the drive of all the elements, including the pickup roller 36, discharge rollers 44, etc. Thereupon, the operation of the original feeding device 3 is finished.

Figure 11:
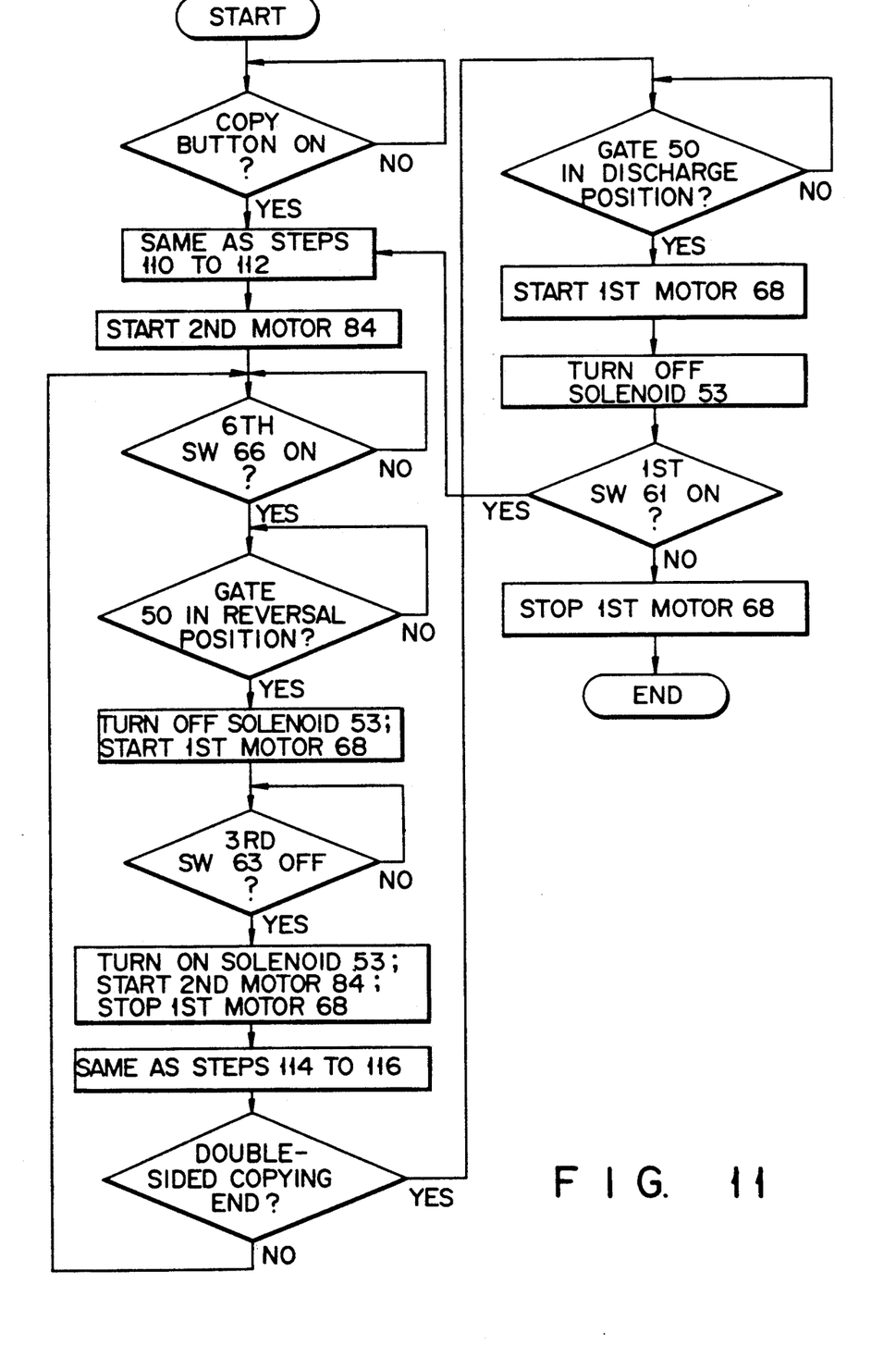
FIG. 11 is a flowchart for illustrating the operation of the original feeding device for double-side copying.

Referring now to the flowchart of FIG. 11, a case will be explained in which an image is formed on each side of the original D.

In double-side copying, the second side of the original must be copied first so that the discharged original papers are arranged in regular order. Accordingly, the original on the original tray 33 is first reversed in the original feeding device 3, and is then reversed again in the device 3 after the copying of the second side is finished. The other processes of operation are executed in the same manner as in the aforementioned single-side copying, and a description of those processes will be omitted.

When an instruction for the double-side copying is inputted through th control panel at the start of the copying operation, the reversal gate 50 is shifted to the reversal position indicated by broken line in FIG. 2. When the copy button is depressed, processes of Steps 110 to 112 for the single-side copying are executed, whereupon the original D is fed onto the original table 30. Then, the second motor 84 is reversely rotated for a given number of revolutions, and the urging plate 51 is rocked in the direction opposite to the direction of arrow u of FIG. 2. Thereupon, the original D is delivered from the table 30 into the discharge path 47a by the feed rollers 48. Since the reversal gate 50 is then set in the reversal position, the original D is introduced from the discharge path 47a to the reversal path 43a. The sixth switch 66 is turned on by the original D, and the first solenoid 53 is turned off after the passage of a predetermined time thereafter, so that the feed rollers 48 are moved to their up position. At the same time, the first motor 68 is actuated to rotate the reversal rollers 41, and the aligning rollers 40 are rotated after the passage of a predetermined time. Thus, the original D is passed through the reversal path 43a to be reversed by the rollers 41, and is transported toward the feed rollers 48 by the aligning rollers 40.

When the third switch 63 is turned off by the trailing end of the original D, the first motor 68 is stopped, and the second motor 84 is actuated. At the same time, the first solenoid 53 is turned on, so that the reversed original D is fed onto the original table 30 by the feed rollers 48. Then, processes of Steps 114 to 116 for the single-side copying are executed. Thus, a given number of copies are made, whereupon the original D is delivered into the discharge path 47a.

Then, whether copying both sides of the original D is finished is determined. If the conclusion is negative, the program returns to Step 122, whereupon the reverse side of the original D is copied. If the double-side copying is finished, the reversal gate 50 is shifted to the discharge position, the first solenoid 53 is turned off, and the first motor 68 is actuated. Thus, the original D is discharged onto the original cover 32 by the discharge rollers 44. If the second original is on the original tray 33 at this time, the program returns to Step 111, whereupon the processes of this step and the subsequent steps are executed. If no original remains on the tray 33, on the other hand, the first motor 68 is stopped, whereupon the copying operation is finished.

According to the automatic original feeding device constructed in this manner, when the original reaches the discharge rollers 44 so that its transportation by means of the rollers 44 is started, in discharging the original from the original table 30, the feed rollers 48 are moved to their up position, where they are kept off the original table 30, and therefore, off the original. Thus, the rollers 48 cease to be concerned in the transportation of the original, so that the paper is transported onto the original cover 32 by the discharge rollers 44 only. Accordingly, there is no need of any complicated mechanism for equalizing the respective speeds of the feed rollers and the discharge rollers, so that the device can be reduced in size and weight. Further, there is no possibility of the original being bent or doubled in the discharge path, or pulled and torn between the rollers, or stained with rubbing marks, due to the difference in speed between the rollers. Thus, a high-reliability original feeding device can be obtained which never damages the original. During the operation for reversal, moreover, the original paper can never be influenced by the difference in speed between the feed rollers 48 and the reversal rollers 41, thus ensuring the same advantages as aforesaid.

Further, the feed rollers 48 can be rotated at higher speed than the discharge rollers 44 and the reversal rollers 41, and the feeding device can be operated at higher speed.

The pickup roller 36, stoppers 37, and feed rollers 48, furthermore, can be shifted between the up and down positions or between the open and closed positions by means of the solenoid 53 only. Thus, the device requires fewer components, and therefore, can be reduced in size and in manufacturing cost.

It is to be understood that the present invention is not limited to the embodiment described above, and that various changes and modifications may be effected therein by one skilled in the art without departing from the scope or spirit of the invention.

For example, it is necessary only that the feed rollers be kept off the original during the transportation of the original by means of the discharge rollers and the reversal rollers, and the timing for the drive of the other components can be freely set without being limited to the foregoing embodiment. Also, the feed rollers may be designed so that they are moved up and down by means of exclusive-use drive means. In this arrangement, the power transmission mechanism can be simplified in construction.

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

What is claimed is:

1. An automatic original feeding device for feeding originals placed at a first position to a second position through an original table of an image forming apparatus, said device comprising:

means for picking up the originals from the first position;

a feed roller for rotating in a first direction to feed the picked-up original onto the original table and for rotating in a second direction opposite to the first direction to deliver the fed original from the original table, said feed roller being movable between an operating position where the feed roller is in contact with the original table so as to deliver the original onto or from the original table, and a non-operating position were the feed roller is separated from the original table;

drive means for rotating the feed roller in the first and second directions;

means for discharging the original delivered from the original table to the second position;

means for reversing the original delivered from the original table and transporting the reversed original again to the feed roller;

means for guiding the original delivered from the original table to the discharging means and the reversing means;

first detection means arranged in the guiding means, for detecting each original, delivered from the original table, at the discharging means and at the reversing means; and means for moving the feed roller to the non-operating position when the original is detected by the first detection means.

2. A device according to claim 1, wherein said moving means includes means for shifting the feed roller between the operating position and the non-operating position, and control means for operating the shifting means to move the feed roller to the nonoperating position when the original is detected by the first detection means.

3. A device according to claim 2, wherein said moving means includes second detection means for detecting the arrival of the original, picked up by the picking up, at the feed roller, and said control means operates the shifting means to shift the means to the operating position when the arrival of the original is detected by the second detection means.

4. A device according to claim 2, wherein said picking-up means includes a pickup roller movable between a down position, where the pickup roller is placed on the uppermost original placed at the first position, and an up position where the pickup roller is off the uppermost original, and a stopper movable between a closed position where the stopper abuts against the leading ends of the originals at the first position so as to restrain the pick-up of the originals, and an open position where the originals are allowed to be picked up; and said shifting means includes a drive source and means for transmitting the drive force of the drive source to the feed roller, the pickup roller, and the stopper so that the pickup roller and the stopper are moved to the down position and the open position, respectively, in interlock with the movement of the feed roller to the operating position.

5. A device according to claim 1, which further comprises a cover mounted on said image forming apparatus to be movable between a closed position where the original table is covered thereby, and an open position where the original table is exposed, an original hold member supported by the cover so as to be movable between a down position where the hold member is in contact with the original table and an up position off the original table, when the cover is in the closed position, and means for moving the hold member to the up position when the original is delivered to or from the original table by means of the feed roller.

6. An automatic original feeding device for feeding originals placed at a first position to a second position through an original table of an image forming apparatus, said device comprising:

means for picking up the originals from the first position;

a feed roller for rotating a first direction to feed the picked-up original onto the original table and for rotating in a second direction opposite to the first direction to deliver the fed original from the original table, said feed roller being movable between an operating position where the feed roller is in contact with the original table so as to deliver the original onto or from the original table, and a non-operating position where the feed roller is off of the original table;

drive means for rotating the feed roller in the first and second directions;

means for discharging the original delivered from the original table to the second position;

means for reversing the original delivered from the original table and transporting the reversed original again to the feed roller;

means for detecting the original, picked-up by the picking-up means and the reversed original transported by the reversing means; and means for stopping the operation of the reversing means and moving the feed roller to the operating position when the original is detected by the detecting means.

7. An automatic original feeding device for feeding originals placed at a first position to a second position through an original table of an image forming apparatus, said device comprising:

means for picking up the originals from the first position;

a feed roller for rotating a first direction to feed the picked-up original onto the original table and for rotating a second direction opposite to the first direction to deliver the fed original from the original table, said feed roller being movable between an operating position where the feed roller is in contact with the original table so as to deliver the original onto or from the original table, and a non-operating position where the feed roller is off from the original table;

drive means for rotating the feed roller in the first and second direction;

means for discharging the original delivered from the original table to the second position;

means for reversing the original delivered from the original table and transporting the reversed original again to the feed roller;

means for guiding the original delivered from the original table to the discharging means and the reversing means, said guiding means including a guide path extending from a position between the picking-up means and the feeding means to a position near the discharging means and the reversing means, and a guide plate movable between a first position where it allows the original picked-up by the picking-up means to be transferred to the feed roller and a second position where it guides the original delivered from the original table into the guide path; and means for moving the feed roller to the non-operating position when the original delivered from the original table is transferred to a predetermined position in the guide path.

8. A device according to claim 7, wherein said moving means includes means for shifting the feed roller between the operating position and the non-operating position, first detection means for detecting the arrival of the original, delivered from the original table, at the reversing means, and control means for operating the shifting means to shift the feed roller to the nonoperating position when the original is detected by the first detection means.

9. A device according to claim 1, which further comprises a second drive means for driving the discharging means.

10. A device according to claim 6, which further comprises a means for moving the feed roller to the non-operating position at the start of operation of the discharging means and reversing means.

* * * * *